United States Patent
Asai

(10) Patent No.: US 6,259,402 B1
(45) Date of Patent: Jul. 10, 2001

(54) GPS RECEIVER SUSPENDING CORRELATION VALUE CALCULATION PROCESS FOR TIME PERIOD CORRESPONDING TO CONDITION OF RECEIVED SIGNAL

(75) Inventor: Takashi Asai, Hyogo (JP)

(73) Assignee: Mitsubishi Denki Kabushiki Kaisha, Toyko (JP)

( * ) Notice: Subject to any disclaimer, the term of this patent is extended or adjusted under 35 U.S.C. 154(b) by 0 days.

(21) Appl. No.: 09/438,539

(22) Filed: Nov. 12, 1999

(30) Foreign Application Priority Data

May 26, 1999 (JP) .................................................. 11-146637

(51) Int. Cl.$^7$ .............................. G01S 5/02; H04B 7/185
(52) U.S. Cl. ........................................................ 342/357.12
(58) Field of Search ......................................... 342/357.12

(56) References Cited

FOREIGN PATENT DOCUMENTS

| | | |
|---|---|---|
| 63-106581 | 5/1988 | (JP) . |
| 7-140224 | 6/1995 | (JP) . |

Primary Examiner—Thomas H. Tarcza
Assistant Examiner—Fred H Mull

(74) Attorney, Agent, or Firm—McDermott, Will & Emery

(57) ABSTRACT

A GPS receiver being able to realize reduction of power consumption in a tracking process includes: a receiving portion receiving a signal transmitted from a satellite; a correlation value calculation portion connected to the receiving portion generating a pseudo noise signal corresponding to the satellite and calculating a correlation value of a reception signal output from the receiving portion and the pseudo noise signal; a data demodulation device connected to the correlation value calculation portion demodulating data included in the reception signal based on the correlation value every predetermined cycle; a time period determination device connected to the correlation value calculation portion seeking a condition of the reception signal at reception based on the correlation value and determining a correlation value calculation period at the correlation value calculation portion according to the condition at the reception; and a process suspension control device connected to the time period determination device and the correlation value calculation portion obtaining a suspension period of an operation relating to the calculation of the correlation value at the correlation value calculation portion based on the predetermine cycle and the correlation value calculation period and suspending the operation relating to the calculation of the correlation value at the correlation value calculation portion for the suspension period.

17 Claims, 7 Drawing Sheets

GPS RECEIVER SUSPENDING CORRELATION VALUE CALCULATION PROCESS FOR TIME PERIOD CORRESPONDING TO CONDITION OF RECEIVED SIGNAL

BACKGROUND OF THE INVENTION

1. Field of the Invention

The present invention relates to GPS (Global Positioning System) receivers receiving transmission signals from satellites and demodulating data included in the transmission signals. The present invention particularly relates to a GPS receivers receiving a transmission signal from a satellite after acquisition of the satellite while tracking the satellite and demodulating data included in a reception signal every predetermined cycle.

2. Description of the Background Art

The GPS receiver receives a transmission signal from a satellite and demodulates data included in the transmission signal every predetermined cycle. Processes performed by such GPS receiver mainly include an acquisition process for acquiring a desired satellite among a plurality of satellites and a tracking process for demodulating the transmission signal transmitted from the satellite every predetermined cycle after the acquisition of the desired satellite while tracking the satellite.

Generally, in the satellite acquisition process, the GPS receiver calculates a correlation value of a reception signal and a pseudo noise signal (hereinafter referred to as PN signal) corresponding to a number of the satellite, while changing a code phase and a carrier frequency. The GPS receiver determines whether the satellite has been acquired or not based on an amount of energy of the correlation value. In the satellite tracking process after the acquisition of the desired satellite in the above described manner, the GPS receiver generally calculates a correlation value every predetermined cycle (hereinafter referred to as a correlation value output interval) in the same manner as in the acquisition process, and performs a data demodulating process based on the magnitude and the sign of the correlation value.

With reference to FIG. 9, a GPS receiver performing such tracking process (hereinafter referred to as tracking-type GPS receiver) includes a receiving device 101 receiving a transmission signal transmitted from a satellite, a carrier signal generation device 102 generating a carrier signal, a multiplier 103 connected to receiving device 101 and carrier signal generation device 102, having one input receiving a reception signal and another input receiving the carrier signal, a pseudo noise signal generation device 104 generating a PN signal, a correlation value calculation device 105 connected to multiplier 103 and pseudo noise signal generation device 104, calculating a correlation value of an output of multiplier 103 and the PN signal, and a data demodulation device 106 connected to an output of correlation value calculation device 105 performing a data demodulation process based on the magnitude and the sign of the correlation value.

With reference to FIG. 10, the relation of a period spent for correlation value calculation and timing of the correlation value output in the tracking-type GPS receiver shown in FIG. 9 will be described. As can be seen from the drawing, the transmission signal from the satellite is demodulated every predetermined cycle (correlation value output interval) in the tracking process. Therefore, the correlation value is set to be output every correlation value output interval.

In addition, even if the period spent for correlation value calculation is set shorter than the correlation value output interval mentioned above in the tracking process, the tracking-type GPS receiver could not perform data demodulation before the next cycle. Therefore, as far as the calculation of the correlation value is performed during the correlation value output interval, there would be no problem. In other words, even if the correlation value were calculated in a shorter period than the correlation value output interval, the process speed would not be improved. On the other hand, it is well known that when the correlation value calculation period (time spent for calculation of the correlation value by multiplication of PN signal) is shortened, receiving sensitivity of the signal degrades accordingly, and conversely, when the correlation value calculation period is lengthened, the receiving sensitivity of the signal is improved accordingly. Therefore, the probability of successful data demodulation is increased as the correlation value calculation period lengthens.

When the correlation value calculation period is set equal to the correlation value output interval during which demodulation is performed at the tracking process, a correct and fast data demodulation will be realized at the tracking. Hence, conventionally the correlation value calculation period is set equal to the correlation value output interval.

Japanese Patent Laying-Open No. 7-140224 discloses a technique for realizing a high-speed acquisition process by changing a time for multiplication of a PN signal according to a reception signal received by a GPS receiver and reducing a time for correlation value calculation. In the acquisition process, decision of acquisition is executed in accordance with the correlation value. Therefore, a fast acquisition can be realized by shortening the correlation value calculation period. In the tracking process, however, dissimilar to the acquisition process, the fast process cannot be achieved in the same manner because the data demodulation is performed every predetermined cycle.

The minimum correlation value calculation period necessary for data demodulation is not always fixed and dynamically changes according to the condition of the reception signal. When the condition of the reception signal is good, for example, the transmission signal can be demodulated with a short correlation value calculation period.

Hence, when the correlation value calculation period is set equal to the correlation value output interval as in the conventional tracking-type GPS receiver, a longer time period than a required minimum correlation value calculation period is spent for the calculation of correlation value when the condition of the reception signal is good. This means that a correlation value calculation device and so on operate for an extra time. As a result, an extra power is consumed by the operation of this period and the extra power consumption continues until the tracking process completes.

SUMMARY OF THE INVENTION

The present invention is made to solve the above described problems and an object of the present invention is to provide a GPS receiver allowing the reduction of power consumption in the tracking process.

Another object of the present invention is to provide a GPS receiver allowing the determination of the correlation value calculation period in an early stage.

Still another object of the present invention is to provide a GPS receiver realizing a simple demodulation process.

The GPS receiver according to one aspect of the present invention includes: a receiving portion receiving a signal transmitted from a satellite; a correlation value calculation portion connected to the receiving portion generating a pseudo noise signal corresponding to a number of the satellite and calculating a correlation value of a reception signal output from the receiving portion and the pseudo noise signal; a data demodulation device connected to the correlation value calculation portion demodulating data included in the reception signal based on the correlation value every predetermined cycle; a time period determination device connected to the correlation value calculation portion seeking a condition of the reception signal at reception based on the correlation value and determining a correlation value calculation period at the correlation value calculation portion according to the condition at the reception; and a process suspension control device connected to the time period determination device and the correlation value calculation portion obtaining a suspension period of an operation relating to the calculation of the correlation value at the correlation value calculation portion based on the predetermine cycle and the correlation value calculation period and suspending the operation relating to the calculation of the correlation value at the correlation value calculation portion for the suspension period.

The time period determination device determines a time period required for the calculation of the correlation value (correlation value calculation period) according to the condition of received signal. The process suspension control device calculates the time period of suspending the operation relating to the correlation value calculation based on the predetermined cycle and the correlation value calculation period and suspends the operation relating to the correlation value calculation in the correlation value calculation portion for the time period obtained through the calculation. Thus, power consumption in the correlation value calculation portion can be reduced and a GPS receiver with low power consumption can be provided.

Preferably, the time period determination device calculates a predicted value of energy of the reception signal based on the correlation value and determines the correlation value calculation period based on an amount of the predicted energy value.

Thus, the correlation value calculation period is found based on the predicted energy value. Therefore, the correlation value calculation period can be determined earlier than in the case where the correlation value calculation period is found based on an actual amount of energy.

Still more preferably, the process suspension control device is connected to the time period determination device, the correlation value calculation portion, the carrier signal generation device and the pseudo noise signal generation device obtains a suspension period of an operation relating to a calculation of the correlation value at the correlation value calculation portion based on the predetermined cycle and the correlation value calculation period and suspends operation(s) of a part or all of the correlation value calculation portion, the carrier signal generation device and the pseudo noise signal generation device for the suspension period.

The process suspension control device can suspend operations of the carrier signal generation device and the pseudo noise signal generation device in addition to that of the correlation value calculation device. Therefore, power consumption for these operations can be reduced.

Still more preferably, the correlation value calculation portion outputs the correlation value every predetermined cycle.

The correlation value is output every predetermined cycle. Hence, the data demodulation device can demodulates the data based on the correlation value in synchronization with the predetermined cycle. Thus, the data demodulation device can perform a simple demodulation process.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
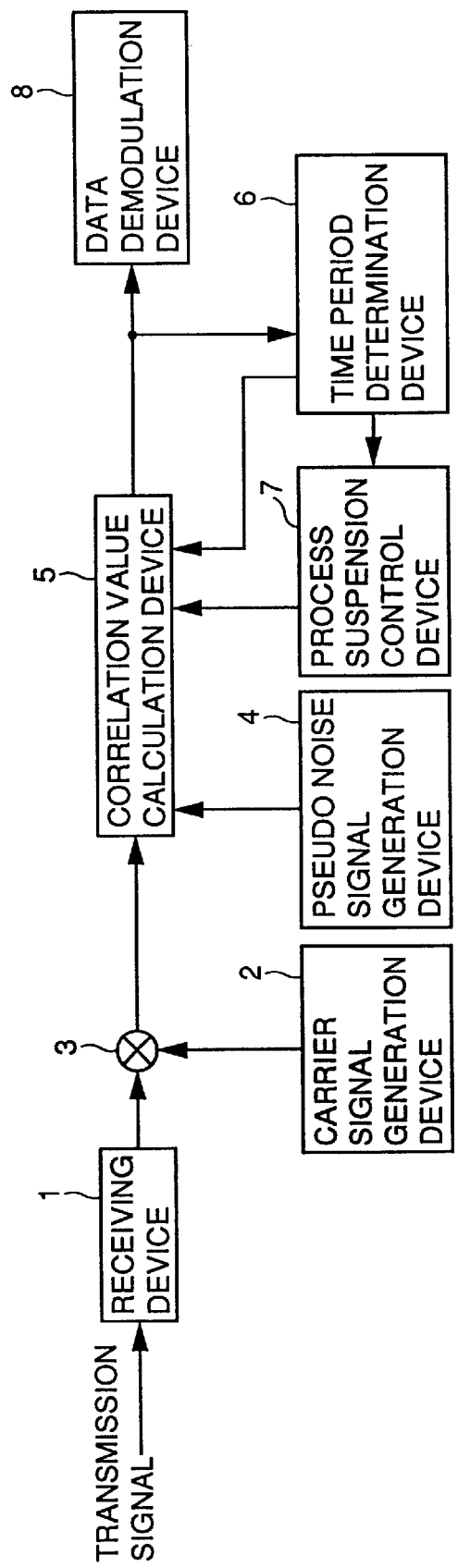
FIG. 1 is a block diagram showing a configuration of a GPS receiver according to the first embodiment of the present invention.

With reference to FIG. 1, a GPS receiver according to the first embodiment of the present invention includes a receiving device 1 receiving a transmission signal transmitted from a GPS satellite; a carrier signal generation device 2 generating a carrier signal; a multiplier 3 connected to receiving device 1 and carrier signal generation device 2 multiplying the a reception signal received by receiving device 1 by the carrier signal; a pseudo noise signal generation device 4 generating a predetermined PN signal; a time period determination device 6 connected to a correlation value calculation device 5 described later determining a time period for calculating a correlation value (correlation value calculation period) at correlation value calculation device 5; correlation value calculation device 5 connected to multiplier 3, pseudo noise signal generation device 4 and time period determination device 6 calculating the correlation value of an output of multiplier 3 and the PN signal during the correlation value calculation period; a process suspension control device 7 connected to an output of time period determination device 6 and correlation value calculation device 5 comparing the correlation value calculation period and an interval (correlation value output interval) of data modulation by a data demodulation device 8 described later and controlling correlation value calculation device 5 to suspend a part or all operation of correlation value calculation device 5 according to the comparison result; and data demodulation device 8 connected to an output of correlation value calculation device 5 demodulating each data included in the reception signal received by receiving device 1 every correlation value output interval based on the magnitude and the sign of the correlation value mentioned above. Here, the correlation value output interval previously is stored in process suspension control device 7 and data demodulation device 8.

Figure 2:
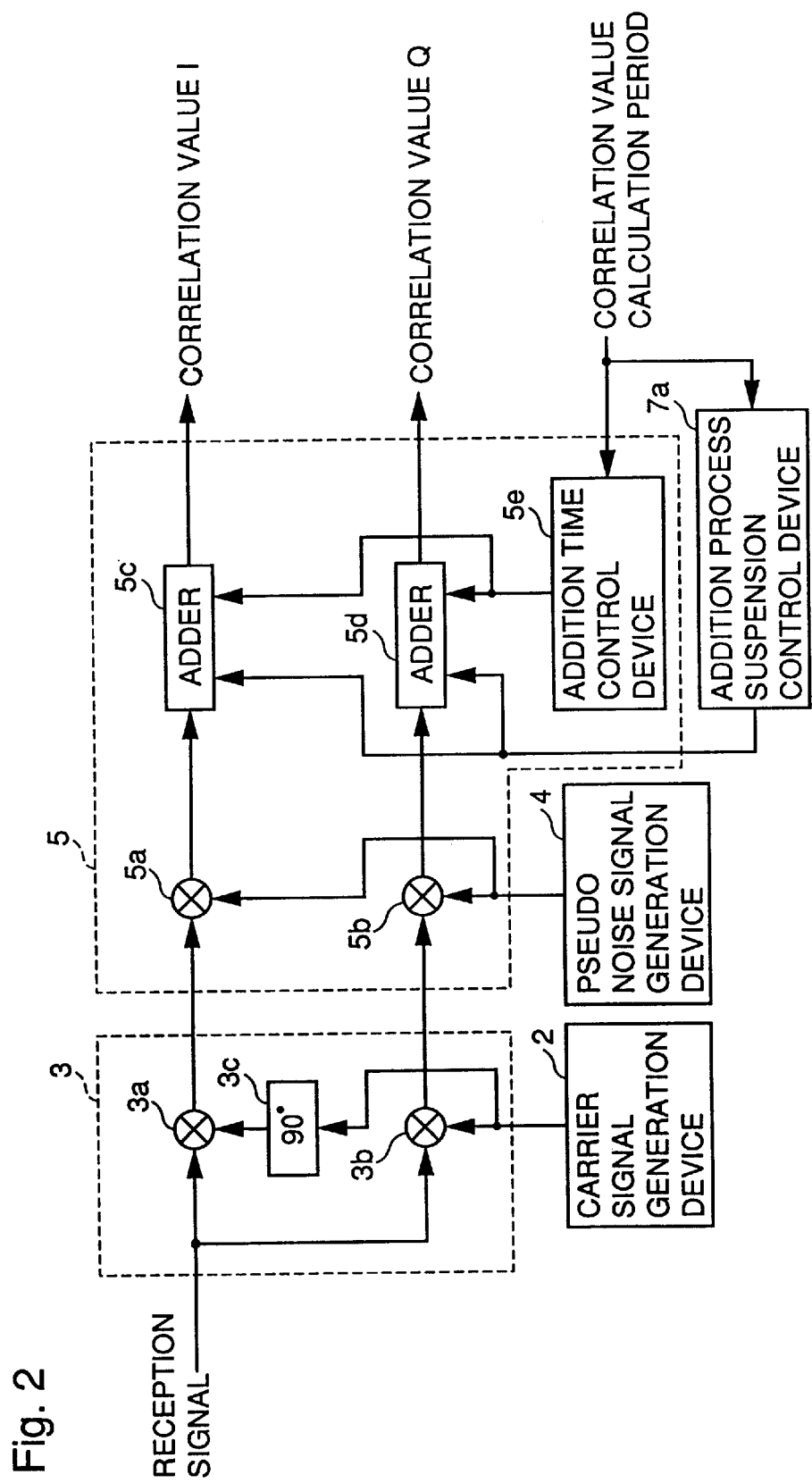
FIG. 2 is a block diagram showing a configuration of a multiplier 3 and a correlation value calculation device 5 of a GPS receiver according to the first embodiment of the present invention.

With reference to FIG. 2, multiplier 3 includes a multiplier 3b connected to receiving device 1 and carrier signal generation device 2 multiplying the reception signal received by receiving device 1 by the carrier signal, a phase shifter 3c connected to an output of carrier signal generation device 2 shifting the phase of the carrier signal by 90°, and a multiplier 3a connected to receiving device 1 and phase shifter 3c multiplying the reception signal received by receiving device 1 by the carrier signal having the phase shifted by 90°.

Correlation value calculation device 5 includes a multiplier 5a connected to multiplier 3a and pseudo noise signal generation device 4 multiplying an output of multiplier 3a by the PN signal, a multiplier 5b connected to multiplier 3b and pseudo noise signal generation device 4 multiplying an output of multiplier 3b by the PN signal, an adder 5c connected to multiplier 5a accumulating outputs of multiplier 5a during the correlation value calculation period, an adder 5d connected to multiplier 5b accumulating outputs of multiplier 5b during the correlation value calculation period, and an addition time control device 5e connected to time period determination device 6 and adders 5c and 5d receiving the correlation value calculation period and controlling adders 5c and 5d so that adders 5c and 5d perform the accumulation process during the correlation value calculation period.

Process suspension control device 7 includes an addition process suspension control device 7a connected to time period determination device 6 comparing the correlation value calculation period and the correlation value output interval and suspending operations of adders 5c and 5d for a predetermined time when the correlation value calculation period is shorter than the correlation value output interval.

Generally, a transmission signal transmitted from a satellite includes data every cycle having a length corresponding to one cycle or some cycles of a PN signal. Therefore, for data demodulation in the tracking process, data is demodulated every cycle having a length corresponding to a length of one cycle or some cycles of the PN signal or every cycle each data mentioned above is included. The correlation value output interval described above corresponds to the cycle having a length corresponding to the length of one cycle or some cycles of the PN signal or the cycle each data mentioned above is included.

Next, an operation of the GPS receiver shown in FIGS. 1 and 2 will be described.

The transmission signal transmitted from the GPS satellite has been modulated by the PN signal assigned to each satellite and further modulated by the carrier signal for transmission. Each satellite transmits the transmission signal including an individual data every predetermined cycle. The GPS receiver acquires each satellite transmitting such transmission signal (acquisition process) and then performs a process described below in order to demodulate the transmission signal of the satellite while tracking the corresponding satellite. The following is the description of the tracking process in the GPS receiver shown in FIGS. 1 and 2.

Receiving device 1 receives the transmission signal. Multipliers 3b and 3a multiply the reception signal received by receiving device 1 by the carrier signal generated by carrier signal generation device 2 and by the carrier signal having the phase shifted by 90° by phase shifter 3c, respectively. Multipliers 5a and 5b multiply outputs of multipliers 3a and 3b by the PN signal generated by pseudo noise signal generation device 4, respectively. Outputs of multipliers 5a and 5b are summed in adders 5c and 5d, respectively, during the correlation value calculation period determined by time period determination device 6 whereby correlation values I and Q are produced. Operations of adders 5c and 5d are each controlled by addition time control device 5e and the correlation values I and Q mentioned above are provided to demodulation device 8 every predetermined cycle (correlation value output interval).

Time period determination device 6 determines the correlation value calculation period as described below.

Time period determination device 6 calculates a strength A of the reception signal based on the expression (1) or the expression (2) using correlation values I and Q calculated by correlation value calculation device 5.

$$A=|\text{correlation value }I|+|\text{correlation value }Q| \quad (1)$$

$$A=\{|\text{correlation value }I_0|+|\text{correlation value }Q_0|+\ldots+|\text{correlation value }I_{N-1}|+|\text{correlation value }Q_{N-1}|\}/N \quad (2)$$

Here, assume that correlation values $I_i$ (i=0, ..., N−1) and correlation values $Q_i$ (i=0, ..., N−1) are the correlation values calculated at different times.

Time period determination device 6 determines a correlation value calculation period corresponding to strength A of the reception signal based on a previously prepared conversion table of strength A of reception signal and the correlation value calculation period as shown in Table 1.

TABLE 1

Conversion Table of Strength A of Reception Signal and Correlation Value Calculation Period

| A | Correlation value Calculation period |
|---|---|
| A1 > A ≧ A0 | T0 |
| A2 > A ≧ A1 | T1 |
| ... | ... |
| An > A ≧ An − 1 | Tn − 1 |

Ai (i = 0, ..., n): threshold value of strength A of reception signal
Ti (i = 0, ..., n − 1): correlation value calculation period (where Tn − 1 < Tn − 2 < ... < T0)

As shown in Table 1, the correlation value calculation period is set to become shorter as strength A of reception signal increases and to become longer as strength A of reception signal decreases. In other words, time period determination device 6 dynamically sets the correlation value calculation period such that the correlation value calculation period becomes short when the condition of reception signal is good and that the correlation value calculation period becomes long when the condition of reception signal is bad. Thus, the correlation value calculation period required for data demodulation is calculated.

Figure 3:
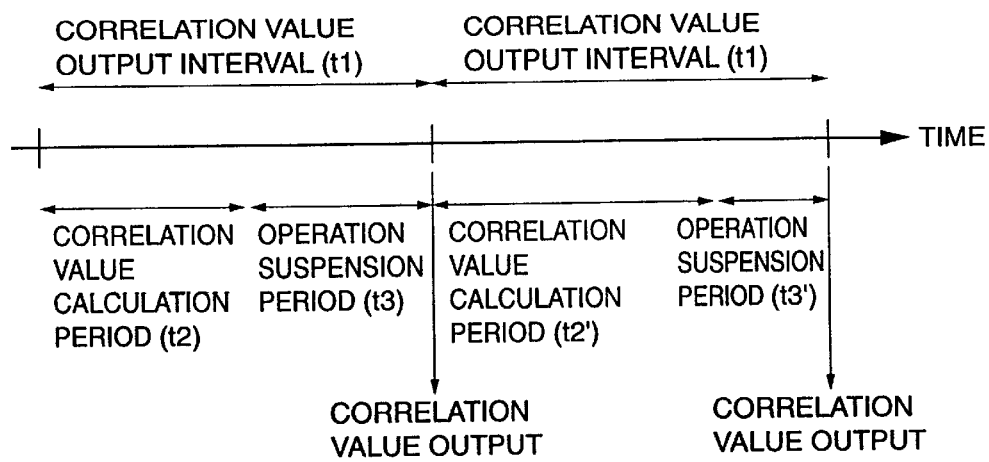
FIG. 3 is a diagram showing a relation between the correlation value calculation period and the period for suspending operations of portions of a GPS receiver determined based on the correlation value calculation period.

Thus determined correlation value calculation period is provided to addition process suspension control device 7a as well as to addition time control device 5e for calculating the correlation value described above. Receiving the correlation value calculation period, addition process suspension control device 7a compares the correlation value calculation period thus provided and the correlation value output interval. When the result of the comparison shows that the correlation value calculation period is shorter than the correlation value output interval, addition process suspension control device 7a controls such that adders 5c and 5d do not operate for a predetermined time period. With reference to FIG. 3, time period for suspending the operations of adders 5c and 5d may be set to a time period obtained by subtracting correlation value calculation period t2 from correlation value output interval t1, that is, time period t3 (=t1−t2).

Figure 4A:
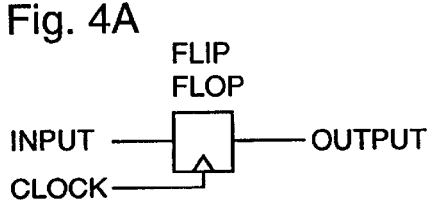
FIGS. 4A and 4B show a part of the configuration of adders 5c and 5d.
Figure 4B:
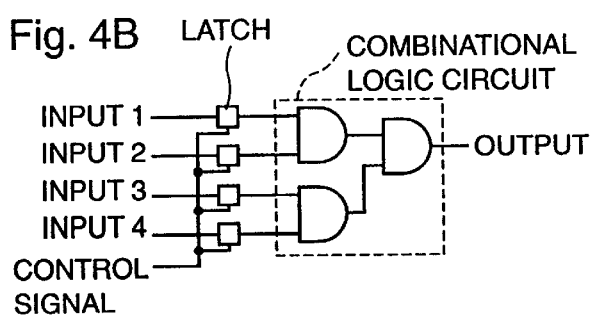

A necessary operation of addition process suspension control device 7a for suspending the operations of adders 5c and 5d is only to control that inputs to transistors constituting adders 5c and 5d would not change. With reference to FIG. 4A, when adders 5c and 5d include a flip flop, for example, a necessary operation is merely to control a clock such that it would not change. With reference to FIG. 4B, when adders 5c and 5d include a combinational logic circuit, a latch is connected to an input of the combinational logic circuit and a clock to the latch is controlled such that the input to the combinational logic circuit would not change. Further, when the operation of the adder is controllable by program, a process corresponding to the operation of the adder may be skipped.

In this embodiment, the correlation value calculation period is determined based on strength A of the reception signal. The procedure of calculating the correlation value calculation period is not limited to the procedure employing strength A obtained from the expression (1) or the expression (2). For example, the correlation value calculation period corresponding to strength B of the reception signal may be determined by calculating strength B of the reception signal based on the expression (3) or the expression (4) as described below, and using the strength B of the reception signal obtained through calculation and a previously prepared conversion table of strength B of the reception signal and the correlation value calculation period as shown in Table 2.

$$B = |\text{correlation value } I| \qquad (3)$$

$$B = \{|\text{correlation value } I_0| + \ldots + |\text{correlation value } I_{N-1}|\}/N \qquad (4)$$

Here, correlation values $I_i$ (i=0, . . . , N−1) are correlation values calculated at different times.

TABLE 2

Conversion Table of Strength B of Reception Signal and Correlation Value Calculation Period

| B | Correlation value Calculation period |
|---|---|
| B1 > B ≧ B0 | T0 |
| B2 > B ≧ B1 | T1 |
| ... | ... |
| Bn > B ≧ Bn − 1 | Tn − 1 |

Bi (i = 0, . . ., n): threshold value of strength B of reception signal
Ti (i = 0, . . ., n − 1): correlation value calculation period (where Tn − 1 < Tn − 2 < . . . < T0)

The GPS receiver of this embodiment dynamically changes the correlation value calculation period according to the condition of the received signal and suspends the operation of the correlation value calculation device for a predetermined period when the correlation value calculation period is shorter than the correlation value output interval. Thus, it is possible to reduce power consumption in the correlation value calculation device.

In addition, when correlation value I is controlled to be significantly larger than correlation value Q through the adjustment of the phase of the carrier signal generated by the carrier signal generation device, the correlation value calculation period can be determined based on strength B of the reception signal. Whereby the demodulation can be performed in a similar manner to the case where the correlation value calculation period is determined based on strength A of reception signal, besides, the time required for calculation can be reduced.

Second Embodiment

In the first embodiment, the reception signal received by the receiving device is multiplied first by the carrier signal and then the result is multiplied by the PN signal. In the second embodiment, the reception signal received by the receiving device is first multiplied by the PN signal and then the result is multiplied by the carrier signal.

Figure 5:
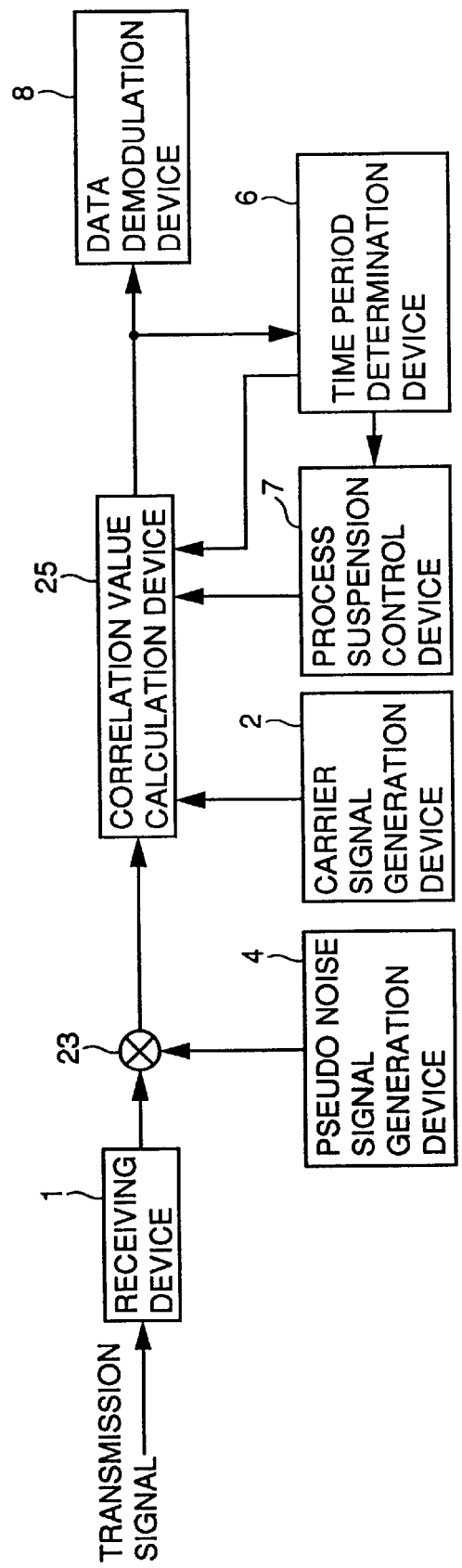
FIG. 5 is a block diagram showing a configuration of a GPS receiver according to the second embodiment of the present invention.

With reference to FIG. 5, a GPS receiver according to the second embodiment includes: a receiving device 1; a pseudo noise signal generation device 4; a multiplier 23 connected to receiving device 1 and pseudo noise signal generation device 4 multiplying the reception signal received by receiving device 1 by a PN signal generated by pseudo noise signal generation device 4; a carrier signal generation device 2; a time period determination device 6; a process suspension control device 7; a data demodulation device 8; and a correlation value calculation device 25 connected to multiplier 23, carrier signal generation device 2, process suspension control device 7, time period determination device 6 and data demodulation device 8 calculating a correlation value of an output of multiplier 23 and a carrier signal generated by carrier signal generation device 2 during the correlation value calculation period determined by time period determination device 6. The correlation value calculated by correlation value calculation device 25 is in effect a correlation value of the reception signal of receiving device 1 and the PN signal. Receiving device 1, carrier signal generation device 2, pseudo noise signal generation device 4, time period determination device 6, process suspension control device 7 and data demodulation device 8 have the similar functions as those in the GPS receiver according to the first embodiment described with reference to FIG. 1. Hence the description thereof will not be repeated.

Figure 6:
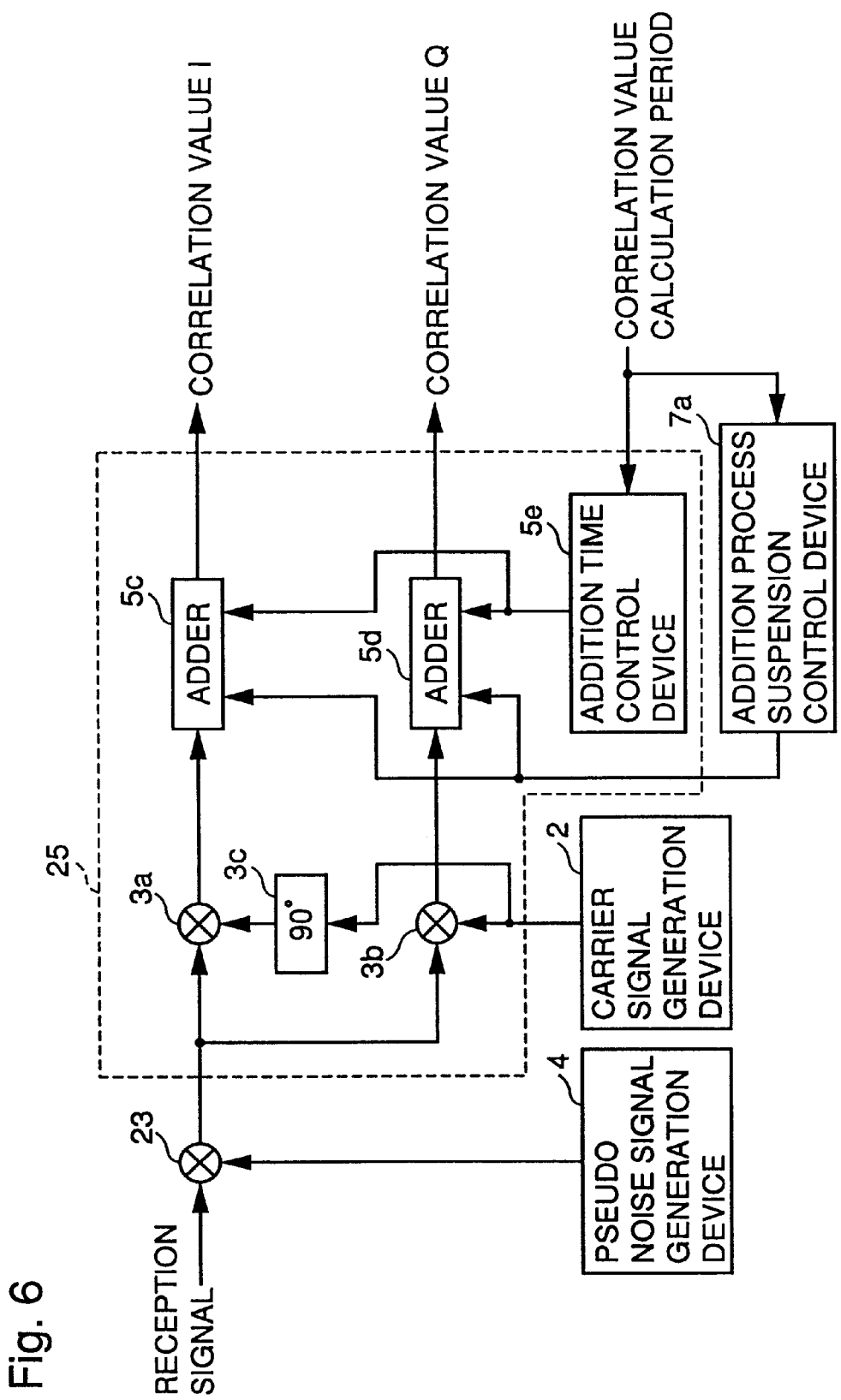
FIG. 6 is a block diagram showing a configuration of a correlation value calculation device 25 according to the second embodiment of the present invention.

With reference to FIG. 6, correlation value calculation device 25 includes a multiplier 3b connected to multiplier 23 and carrier signal generation device 2 multiplying an output of multiplier 23 by the carrier signal, a phase shifter 3c connected to an output of carrier signal generation device 2 shifting the phase of the carrier signal by 90°, a multiplier 3a connected to multiplier 23 and phase shifter 3c multiplying an output of multiplier 23 by the carrier signal having the phase shifted by 90°, an adder 5c connected to multiplier 3a, addition time control device 5e and addition process suspension control device 7a accumulating outputs of multiplier 3a during the correlation value calculation period, an adder 5d connected to multiplier 3b, addition time control device 5e and addition process suspension control device 7a accumulating outputs of multiplier 3b during the correlation value calculation period, and addition time control device 5e. Addition time control device 5e is same with that of the GPS receiver according to the first embodiment described with reference to FIG. 1. Therefore the description thereof will not be repeated.

Process suspension control device 7 includes addition process suspension control device 7a. Addition process suspension control device 7a is same with that of the GPS receiver according to the first embodiment described with reference to FIG. 1. Hence the description thereof will not be repeated.

An operation of the GPS receiver shown in FIGS. 5 and 6 differs from that of the GPS receiver according to the first embodiment in the following points. With reference to FIG. 2 again, in the GPS receiver according to the first embodiment, the reception signal received by receiving device 1 is multiplied by the carrier signal generated by carrier signal generation device 2 and the carrier signal having a phase shifted by 90° by phase shifter 3c at multipliers 3b and 3a, respectively. Outputs of multipliers 3a and 3b are multiplied by the PN signal generated at pseudo noise signal generation device 4 at multipliers 5a and 5b, respectively. Conversely, with reference to FIG. 6, in the GPS receiver according to the second embodiment, the reception signal received by receiving device 1 is multiplied by the PN signal generated by pseudo noise signal generation device 4 at multiplier 23. An output of multiplier 23 is multiplied by the carrier signal generated by carrier signal generation device 2 and the carrier signal having the phase shifted by 90° at phase shifter 3c, respectively at multipliers 3b and 3a. Otherwise, the operation is same with that of the first embodiment and the description thereof will not be repeated.

The GPS receiver of the second embodiment dynamically changes the correlation value calculation period according to the condition of received signal and suspends the operation of the correlation value calculation device for a predetermined time period when the correlation value calculation period is shorter than the correlation value output interval. Therefore, the power consumption by the correlation value calculation device can be reduced.

Third Embodiment

The GPS receivers according to the first and the second embodiments suspend only the operation of the correlation value calculation device. On the other hand, a GPS receiver according to the third embodiment suspends not only the operation of the correlation value calculation device but the operations of the carrier signal generation device, the pseudo noise signal generation device and so on.

Figure 7:
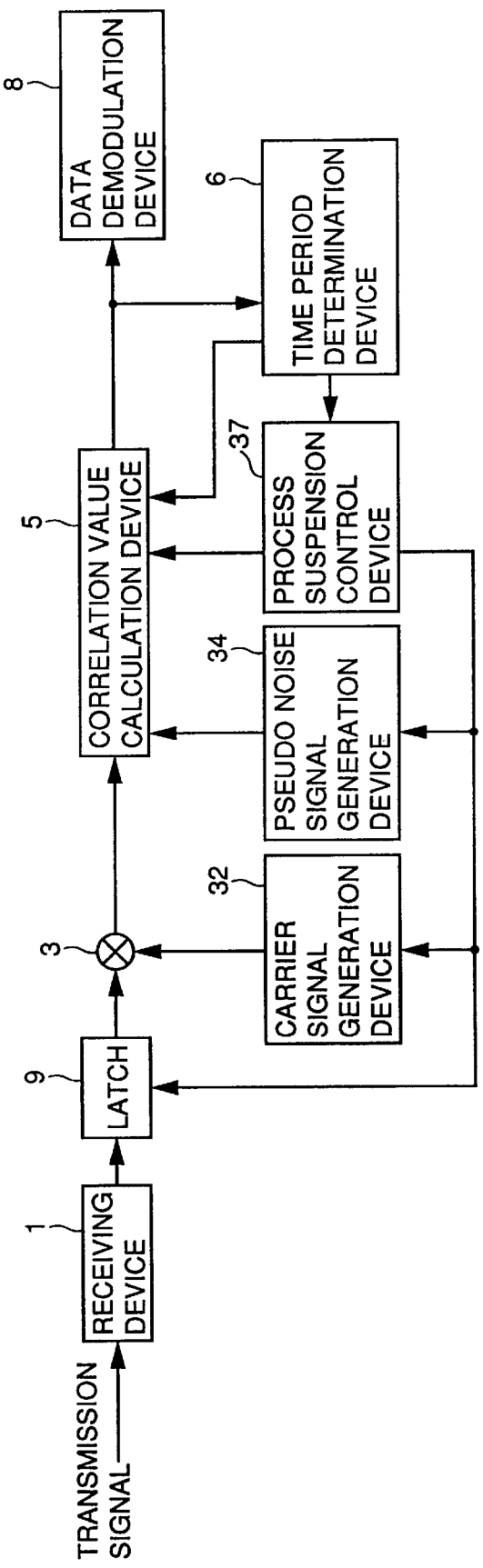
FIG. 7 is a block diagram showing a configuration of a GPS receiver according to the third embodiment of the present invention.

With reference to FIG. 7, the GPS receiver according to the third embodiment includes a receiving device 1; a latch 9 having an input receiving an output of receiving device 1; a carrier signal generation device 32 generating a carrier signal; a multiplier 3 connected to latch 9 and carrier signal generation device 32 multiplying an output of latch 9 by the carrier signal; a pseudo noise signal generation device 34 generating a predetermined PN signal; a time period determination device 6; a process suspension control device 37 connected to time period determination device 6, correlation value calculation device 5, latch 9, carrier signal generation device 32 and pseudo noise signal generation device 34 comparing the correlation value calculation period calculated by time period determination device 6 and a correlation value output period stored therein, and suspending an operation(s) of a part or all of correlation value calculation device 5, carrier signal generation device 32, and pseudo noise signal generation device 34 or suspending an input to latch 9 therefrom when the correlation value calculation period is shorter than the correlation value output period; a correlation value calculation device 5 connected to multi-plier 3, pseudo noise signal generation device 34, process suspension control device 37 and time period determination device 6; and a data demodulation device 8 connected to an output of correlation value calculation device 5. Receiving device 1, multiplier 3, correlation value calculation device 5, time period determination device 6 and data demodulation device 8 have same configuration with those in the GPS receiver according to the first embodiment described above with reference to FIG. 1. Therefore the description thereof will not be repeated.

An operation of the GPS receiver shown in FIG. 7 differs from that of GPS receiver according to the first embodiment in the following points. In the GPS receiver according to the first embodiment, the operation of correlation value calculation device 5 is suspended for a predetermined time period when the correlation value calculation period is shorter than the correlation value output period. On the other hand, in the GPS receiver shown in FIG. 7, not only the operation of correlation value calculation device 5 but also the operations of carrier signal generation device 32 and pseudo noise signal generation device 34 are suspended. In addition, the GPS receiver prevents latch 9 from passing the input signal for a predetermined time period by controlling an input to latch 9. Otherwise the operation is same with that of the first embodiment and the description thereof will not be repeated.

The GPS receiver of the third embodiment dynamically changes the correlation value calculation period according to the condition of received signal and suspends the operation of the correlation value calculation device, the carrier signal generation device, the pseudo noise signal generation device, or the input to the latch for a predetermined time period when the correlation value calculation period is shorter than the correlation value output interval. Hence, power consumption for these operations can be reduced.

Of course, the operation of each portion of the GPS receiver according to the second embodiment can be controlled as in the third embodiment.

Fourth Embodiment

In the first and the second embodiments, in determination of the correlation value calculation period, first, strength A of the reception signal or strength B of the reception signal is calculated based on the expressions (1) and (2) or the expressions (3) and (4), and the correlation value calculation period is determined based on the strength of the reception signal. On the other hand, in the GPS receiver according to the fourth embodiment, energy P of the reception signal is calculated instead of strength A or B of the reception signal, and the correlation value calculation period is determined based on energy P of the reception signal. Processes other than the process to determine the correlation value calculation period are same with those of the first and the second embodiments and the description thereof will not be repeated. In brief, the operation of time determination device 6 is different in FIG. 1 and in FIG. 5 as described below.

Time period determination device 6 calculates energy P of the reception signal from the expression (5) or the expression (6) using correlation values I and Q calculated at correlation value calculation device 5 or 25.

$$P = (\text{correlation value } I)^2 + (\text{correlation value } Q)^2 \qquad (5)$$

$$P = \{(\text{correlation value } I_0)^2 * (\text{correlation value } Q_0)^2 + \ldots + (\text{correlation value } I_{N-1})^2 * (\text{correlation value } Q_{N-1})^2\}/N \qquad (6)$$

Here, correlation values $I_i(i=0, \ldots, N-1)$ and correlation values $Q_i(i=0, \ldots, N-1)$ are calculated at different times.

Time period determination device 6 determines a correlation value calculation period corresponding to energy P of the reception signal based on the energy P of the reception signal obtained through calculation and a previously prepared conversion table of energy P of the reception signal and the correlation value calculation period as shown by Table 3.

TABLE 3

Conversion Table of Energy P and Correlation Value Calculation Period

| P | Correlation value calculation period |
|---|---|
| P1 > P ≧ P0 | T0 |
| P2 > P ≧ P1 | T1 |
| ... | ... |
| Pn > P ≧ Pn − 1 | Tn − 1 |

Pi (i = 0, . . ., n): threshold value of energy
Ti (i = 0, . . ., n − 1): correlation value calculation period (where Tn − 1 < Tn − 2 < . . . < T0)

As shown in Table 3, the correlation value calculation period is set to become shorter as energy P of the reception signal increases and to become longer as energy P of the reception signal decreases. In other words, time period determination device 6 dynamically sets the correlation value calculation period such that the correlation value calculation period becomes short when the condition of the received reception signal is good, and that the correlation value calculation period becomes long when the condition of the received reception signal is bad. Thus, a necessary correlation value calculation period for data demodulation is calculated.

The GPS receiver of the fourth embodiment dynamically changes the correlation value calculation period according to the value of energy of the reception signal and suspends the operation of the correlation value calculation device for a predetermined period when the correlation value calculation period is shorter than the correlation value output interval. Hence, power consumption in the correlation value calculation device can be reduced.

Fifth Embodiment

In first to fourth embodiments, in the determination of the correlation value calculation period, strength A or B of the reception signal or energy P of the reception signal are calculated from the expressions (1), (2), (3), (4), (5) or (6) and the correlation value calculation period is determined based on these value. On the other hand, in the fifth embodiment, error rate E of data demodulation is calculated instead of these values and the correlation value calculation period is determined based on error rate E. Processes other than the process to determine the correlation value calculation period are same with those in first to fourth embodiments and the description thereof will not be repeated. In brief, the operation of time period determination device 6 is different in FIG. 1, FIG. 5 and FIG. 7 as described below.

In the GPS receivers shown in FIG. 1, FIG. 5 or FIG. 7, a correlation value calculation period at which the condition of received signal is optimal is set as an initial value of time period determination device 6. Correlation value calculation device 5 or 25 calculates correlation values I and Q based on a signal received from a satellite. Date demodulation device 8 performs a BPSK (Binary Phase Shift Keying) demodulation process according to correlation values I and Q and extracts a bit string of data transmitted from a satellite.

Data transmitted from the GPS satellite includes a synchronizing bit pattern used for making synchronization every sub frame and an error detecting bit pattern used for detecting if received data contains error. Time period determination device 6 selects the synchronizing bit pattern from the bit string obtained through BPSK demodulation process and established synchronization. After establishing the synchronization, time period determination device 6 examines if data received per sub frame basis contains error or not using the error detecting bit pattern. Time period determination device 6 stores M results of such data error detection and then calculates error rate E using the expression (7).

$$E = Ne/M \quad (7)$$

(where E is error rate, Ne is number of error events, and M is number of error detections.)

Time period determination device 6 previously have stored a conversion table of the error rate and the correlation value calculation period as Table 4 and determines a correlation value calculation period according thereto.

TABLE 4

Conversion Table of Error Rate E and Correlation Value Calculation Period

| E | Correlation value calculation period |
|---|---|
| E1 > E ≧ E0 | Tn − 1 |
| E2 > E ≧ E1 | Tn − 2 |
| ... | ... |
| En > E ≧ En − 1 | T0 |

Ei (i = 0, . . ., n): threshold value of error rate
Ti (i = 0, . . ., n − 1): correlation value calculation period (where Tn − 1 < Tn − 2 < . . . < T0)

Thus, the correlation value calculation period dynamically is set to become shorter as error rate E decreases and to become longer as error rate E increases.

The GPS receiver of the fifth embodiment dynamically changes the correlation value calculation period according to the error rate and suspends the operations of the correlation value calculation device and so on for a predetermined period when the correlation value calculation period is shorter than the correlation value output interval. Hence, power consumption by these devices can be reduced.

Sixth Embodiment

In the forth embodiment described above, in the determination of the correlation value calculation period, energy P of the reception signal is calculated and the correlation value calculation period is determined based on this value. On the other hand, in the sixth embodiment, instead of finding energy P of the reception signal, a position of the satellite is found and energy of the reception signal is predicted based on the position of the satellite, and the correlation value calculation period is determined based on the predicted value. Processes other than the process of determining the correlation value calculation period are same with those of the fourth embodiment and the description thereof will not be repeated. In brief, the operation of time period determination device 6 is different in FIG. 1 and FIG. 5 as described below.

Generally, the transmission signal transmitted from the GPS satellite contains almanac data and ephemeris data as parameters for predicting the position of the GPS satellite. The almanac data can be used for the prediction over a long period of time, that is, for about a month after the reception, yet precision of prediction based on this data is not high. Conversely, the ephemeris data can be used only for a short period of about two hours after the reception, but precision of prediction based on this data is high. The almanac data and the ephemeris data each is extracted from the bit string output from the data demodulation device 8.

Generally, the GPS receiver stores information therein such as a current time, a roughly estimated location of the GPS receiver besides the parameters described above, therefore is able to predict which satellite will be above the GPS receiver. Thus, the location of the satellite is predictable, and in addition, provided that location information on buildings, tress and so on around the GPS receiver can be obtained by means such as a map, the GPS receiver can predict what exists between the satellite and an antenna of the receiver, and so on. Therefore, in the GPS receiver energy of a signal to be received is predictable. Hence, time period determination device 6 can determine the correlation value calculation period by employing the predicted energy value described above instead of energy of actually received signal as in the fourth embodiment earlier than in the case where the calculated energy value is employed.

Figure 8:
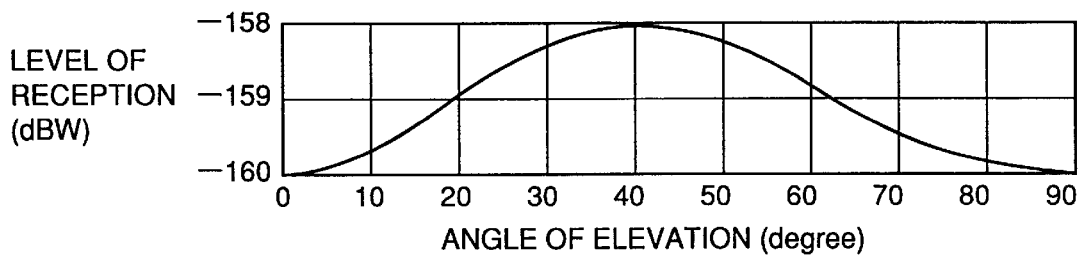
FIG. 8 shows a relation between an angle of elevation of a GPS satellite and minimum signal strength.
Figure 9:
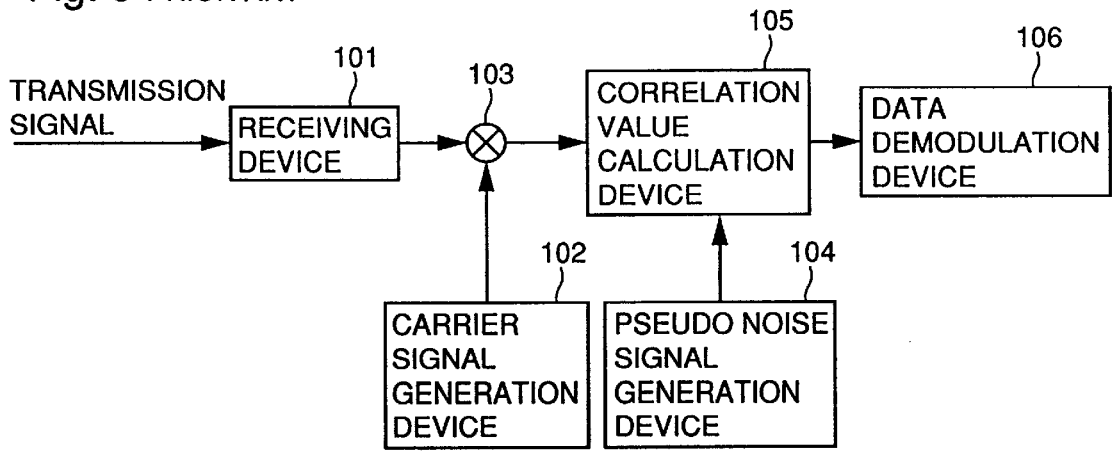
FIG. 9 is a block diagram showing a configuration of a conventional GPS receiver.
Figure 10:
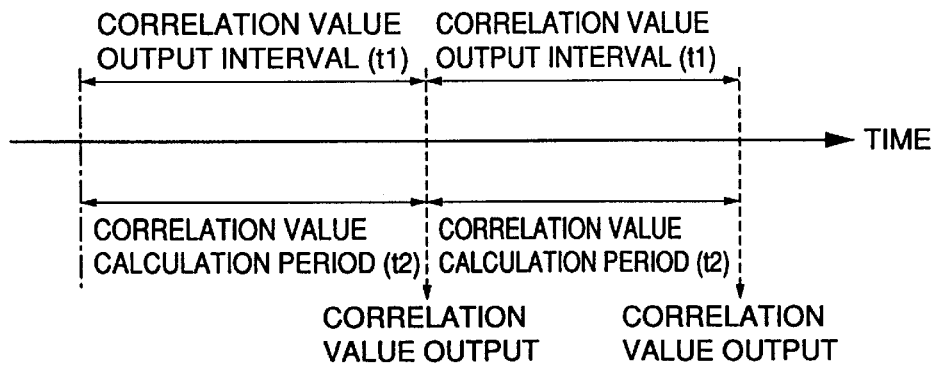
FIG. 10 shows a relation between the correlation value output interval and the correlation value calculation period in a conventional GPS receiver.

In addition, when the location of the GPS satellite is predictable through the almanac data or the ephemeris data, the GPS receiver can calculates an angle of elevation of the satellite from the GPS receiver. The angle of elevation of the satellite and minimum signal strength are known to have a relation shown in FIG. 8. Therefore, when such information has been stored in the GPS receiver and the angle of elevation is calculated based on the location of the GPS satellite, time period determination device 6 can determine the correlation value calculation period based on the predicted energy value before receiving device 1 starts receiving signals. Hence, time period determination device 6 can determine the correlation value calculation period earlier than when using the calculated energy value. In addition, time period determination device 6 can determine the correlation value calculation period even if the location information on buildings, trees and so on around the GPS receiver is not obtained from means such as a map.

In addition, when the almanac data and the ephemeris data are both available, precision of prediction of the signal strength can be improved by employing the ephemeris data alone. Thus, time period determination device 6 can determine the correlation value calculation period more efficiently than when determining the correlation value calculation period employing the almanac data as well.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A GPS (Global Positioning System) receiver comprising:

a receiving portion receiving a signal transmitted from a satellite;

a correlation value calculation portion connected to said receiving portion, generating a pseudo noise signal corresponding to the satellite and calculating a correlation value of a reception signal output from said receiving portion and said pseudo noise signal;

a data demodulation device connected to said correlation value calculation portion, demodulating data included in said reception signal based on said correlation value every predetermined cycle;

a time period determination device connected to said correlation value calculation portion, seeking a condition of said reception signal at reception based on said correlation value and determining a correlation value calculation period at said correlation value calculation portion according to said condition at the reception; and a process suspension control device connected to said time period determination device and said correlation value calculation portion, obtaining a suspension period of an operation relating to the calculation of said correlation value at said correlation value calculation portion based on said predetermine cycle and said correlation value calculation period and suspending the operation relating to the calculation of said correlation value at said correlation value calculation portion for said suspension period.

2. The GPS receiver according to claim 1, wherein said time period determination device calculates a strength of said reception signal based on said correlation value and determines said correlation value calculation period based on the strength of said reception signal.

3. The GPS receiver according to claim 1, wherein said time period determination device calculates energy of said reception signal based on said correlation value and determines said correlation value calculation period based on an amount of said energy.

4. The GPS receiver according to claim 1, wherein said time period determination device calculates an error rate at the data demodulation based on data output from said data demodulation device, and determines said correlation value calculation period based on a value of said error rate.

5. The GPS receiver according to claim 1, wherein said time period determination device calculates a predicted energy value of said reception signal based on said correlation value and determines said correlation value calculation period based on an amount of said predicted energy value.

6. The GPS receiver according to claim 1, wherein said time period determination device calculates a predicted energy value of said reception signal based on almanac data contained in the signal transmitted from the satellite, and determines said correlation value calculation period based on an amount of said predicted energy value.

7. The GPS receiver according to claim 1, wherein said time period determination device calculates a predicted energy value of said reception signal based on ephemeris data contained in the signal transmitted from the satellite, and determines said correlation value calculation period based on an amount of said predicted energy value.

8. The GPS receiver according to claim 1, wherein said correlation value calculation portion includes, a carrier signal generation device generating a carrier signal, a first multiplier connected to said receiving portion and said carrier signal generation device, multiplying said reception signal by said carrier signal, a pseudo noise signal generation device generating the pseudo noise signal corresponding to the satellite, a second multiplier connected to said first multiplier and said pseudo noise signal generation device, multiplying an output of said first multiplier by said pseudo noise signal, and an adder connected to an output of said second multiplier, accumulating outputs of said second multiplier.

9. The GPS receiver according to claim 8, wherein said process suspension control device includes an addition suspension control device connected to said time period determination device and said adder, obtaining the suspension period of the operation relating to the calculation of said correlation value at said correlation value calculation portion based on said predetermined cycle and said correlation value calculation period, and suspending an accumulation process at said adder for said suspension period.

10. The GPS receiver according to claim 8, wherein said process suspension control device is connected to a part or all of said adder, said carrier signal generation device and said pseudo noise signal generation device, and suspends operation(s) of a part or all of said adder, said carrier signal generation device and said pseudo noise signal generation device for said obtained suspension period.

11. The GPS receiver according to claim 8, wherein said receiving portion includes, a receiving device receiving the signal transmitted from the satellite, and a latch having an input receiving an output of said receiving device, and wherein said process suspension control device is connected to said time period determination device and said latch, obtains a suspension period of an operation relating to a calculation of said correlation value at said correlation value calculation portion based on said predetermined cycle and said correlation value calculation period and suspends an input to said latch for said suspension period.

12. The GPS receiver according to claim 1, wherein said correlation value calculation portion includes, a pseudo noise signal generation device generating the pseudo noise signal corresponding to the satellite, a first multiplier connected to said receiving portion and said pseudo noise signal generation device, multiplying said reception signal by said pseudo noise signal, a carrier signal generation device generating a carrier signal, a second multiplier connected to said first multiplier and said carrier signal generation device, multiplying an output of said first multiplier by said carrier signal, and an adder connected to an output of said second multiplier accumulating outputs of said second multiplier.

13. The GPS receiver according to claim 12, wherein said process suspension control device includes an addition suspension control device connected to said time period determination device and said adder, obtaining the suspension period of the operation relating to the calculation of said correlation value at said correlation value calculation portion based on said predetermined cycle and said correlation value calculation period, and suspending an accumulation process at said adder for said suspension period.

14. The GPS receiver according to claim 12, wherein said process suspension control device is connected to a part or all of said adder, said carrier signal generation device and said pseudo noise signal generation device, and suspends operation(s) of a part or all of said adder, said carrier signal generation device and said pseudo noise signal generation device for said obtained suspension period.

15. The GPS receiver according to claim 12, wherein said receiving portion includes, a receiving device receiving the signal transmitted from the satellite, and a latch having an input receiving an output of said receiving device, and wherein said process suspension control device is connected to said time period determination device and said latch, obtains a suspension period of an operation relating to a calculation of said correlation value at said correlation value calculation portion based on said predetermined cycle and said correlation value calculation period and suspends an input to said latch for said suspension period.

16. The GPS receiver according to claim 1 wherein said receiving portion includes, a receiving device receiving the signal transmitted from the satellite, and a latch having an input receiving an output of said receiving device, and wherein said process suspension control device is connected to said time period determination device and said latch, obtains a suspension period of an operation relating to a calculation of said correlation value at said correlation value calculation portion based on said predetermined cycle and said correlation value calculation period and suspends an input to said latch for said suspension period.

17. The GPS receiver according to claim 1 wherein said correlation value calculation portion outputs said correlation value every said predetermined cycle.

* * * * *